United States Patent [19]

Hirose et al.

[11] Patent Number: 4,817,288
[45] Date of Patent: Apr. 4, 1989

[54] CUTTING HEAD FOR CORD TYPE MOWER

[76] Inventors: Daijo Hirose, 1669-2, Ayubashiri, Takasu-mura, Gujo-gun, Gifu Prefecture; Mitsukazu Takishita, 311-6, Nakatsuya, Shirotori-cho, Gujo-gun, Gifu Prefecture, both of Japan

[21] Appl. No.: 28,686

[22] Filed: Mar. 20, 1987

[30] Foreign Application Priority Data

Mar. 25, 1986 [JP] Japan ................................. 61-66933

[51] Int. Cl.[4] ........................................... A01D 50/00
[52] U.S. Cl. ...................................... 30/276; 30/347; 56/12.7
[58] Field of Search ..................... 30/276, 347; 56/12.7

[56] References Cited

U.S. PATENT DOCUMENTS

| | | | |
|---|---|---|---|
| 4,104,796 | 8/1978 | Sheldon | 30/276 |
| 4,285,127 | 8/1981 | Zerrer et al. | 30/276 |
| 4,493,151 | 1/1985 | Mitchell | 30/276 |
| 4,550,498 | 11/1985 | Oliver | 30/276 |
| 4,566,189 | 1/1986 | Muto | 30/276 |
| 4,607,431 | 8/1986 | Gay | 30/276 |
| 4,660,286 | 4/1987 | Engelbrecht et al. | 30/276 |

Primary Examiner—Frank T. Yost
Assistant Examiner—Michael D. Folkerts
Attorney, Agent, or Firm—Wenderoth, Lind & Ponack

[57] ABSTRACT

A cutting head for a cord type mower which severs grass and weeds with cords unwound from a cord spool provided within a bowl-shaped rotary casing and radially projected from the rotary casing by rotating the rotary casing at a high rotating speed. A speed change control mechanism is provided within the rotary casing to control the rotating speed of the rotary casing so as to vary it according to the length of the projecting portions of the cords. When the cords wear and shorten, the moment of inertia of the cutting head decreases; consequently the rotating speed of the rotary casing increases and thereby the cords are fed out automatically by the increased centrifugal force acting on the cords. Then, the engaging members members engaging the speed change control plate are moved radially outward by the centrifugal force to reduce the rotating speed of the rotary casing. Thus, the cords are always projected by a predetermined length from the rotary casing for stable mowing operation.

2 Claims, 12 Drawing Sheets

CUTTING HEAD FOR CORD TYPE MOWER

BACKGROUND OF THE INVENTION

1. Field of the Invention:

The present invention relates to improvements in a cutting head for a cord type mower having a rotary casing which contains a spool storing cords which are fed out as the tip portions of the cords are worn, and rotates at a high speed to cut or sever grass or weeds and, more particularly, to improvements in the construction of a cutting head for a cord type mower, for simplifying winding new cords on the spool and for automatically and properly regulating feeding out the cords as the tip portions of the cords are worn or broken off during the mowing operation.

2. Description of the Prior Art:

Various techniques for such purposes have been proposed and applied to practical cutting heads for cord type mowers.

In a conventional cord type mower, for example, a cover attached to the lower end of a rotary casing is struck to remove same from the rotary casing, and then a cord spool is rotated relative to the rotary casing to unwind the cords wound on the spool.

Japanese Unexamined Patent Publication (Kokai) No. 60-83508 discloses a cord type mower having a plurality of interlocking projection means formed on the lower surface of a cord spool contained in a rotary casing which is rotated by a driving source and on a bottom plate attached to the bottom of the rotary casing so as to engage when the cord spool is pressed down by springs, a centrifugal clutch for the cord spool, comprising a plurality of radial ball guide grooves formed in the lower surface of the central pressure plate of the flange of the cord spool decreasing in depth toward the periphery and balls provided in the radial ball guide grooves, respectively, and a plurality of interlocking projection means formed on the upper surface of the upper flange of the cord spool and on the upper inner surface of the rotary casing so as to engage when the cord spool is raised away from the bottom plate.

The former known cord type mower is not provided with any suitable control means for regulating the rotation of the cord spool while unwinding the cords by rotating the cord spool. Therefore, the cords can not be unwound regularly and hence, in some cases, the cords are unwound by a length more than necessary, which is dangerous to the operator.

On the other hand, in the latter known cord type mower, the cord spool is restricted from free rotation by a spring, radial ball guide grooves are formed in the flange of the cord spool, and the balls are provided in the radial ball guide grooves, respectively. Therefore, when the empty cord spool is removed from the rotary casing to replenish the cord spool with new cords, it is possible that the springs recoil and fly away and the balls are lost. If such an accident occurs in a grass field, it is troublesome to find the springs and the balls.

SUMMARY OF THE INVENTION

Accordingly, an object of the present invention is to provide a cutting head for a cord type mower, facilitating replenishing the cord spool with new cords.

Another object of the present invention is to provide a cutting head for a cord type mower, capable of surely and automatically feeding out a necessary length of cords from the cord spool during the mowing operation of the cord type mower.

A cutting head for a cord type mower according to the present invention comprises as the basic components: a bowl-shaped rotary casing with a U-shaped cross section, provided with a central screw rod penetrating through the central portion thereof, having slots for projecting cords therethrough formed in the rim in the open end thereof, and adapted to be driven for rotation by a driving source; a speed change gear for controlling the rotating speed of the rotary casing, including a speed change mechanism having outer grooves of a larger diameter, inner grooves of a smaller diameter and guide grooves extending between the outer and inner grooves, and studs engaging the inner groove and always resiliently biased radially toward the center, and disposed within the rotary casing; a cord spool on which cords are wound fixedly mounted on the speed change gear; and a cover secured to the screw rod with a nut at the open end of the rotary casing.

In a mowing operation, the free end portions of the cords wound on the cord spool are projected through the slots formed in the rim of the rotary casing outside the rotary casing, and then the rotary casing is driven by a driving source for rotation at a rotating speed suitable for mowing to sever grass and weeds with the projecting portions of the cords. The rotating speed suitable for mowing is not necessarily an extraordinarily high rotating speed, but a rotating speed high enough for the cords to sever grass and weeds.

As the mowing operation is continued, the cords wear and the length of the respective projecting portions of the cords shortens, and thereby the mowing function of the cord type mower is reduced. To restore the normal mowing function of the cord type mower, the cords need to be unwound from the cord spool and projected from the rotary casing by an appropriate length, for example, a length on the order of 150 mm.

According to the present invention, the cords are fed outside the rotary casing in the following manner. As the cords wear and shorten, the moment of inertia of the cutting head decreases and, necessarily, the rotating speed of the rotary casing increases. Then, the studs, which have been at the normal position, namely, in the inner grooves of the speed change control plate, while the rotating speed of the speed change control plate is normal move against the resilient force of the spring members biasing the projecting members radially toward the center from the inner grooves through the guide grooves to the outer grooves, respectively. Consequently, the torque increases and the rotating speed of the rotary casing increases. As the rotating speed of the rotary casing increases, the centrifugal force acting on the cords increases, and thereby the cords wound on the cord spool are fed out gradually. After a fixed length of the cords have been thus fed out, further projection of the cords stops. Then, the moment of inertia of the cutting head increases. Consequently, the rotating speed of the rotary casing decreases to the normal mowing speed, and the studs return from the outer groove to the normal position in the inner groove.

Whenever the cords wear, the foregoing cord feeding cycle is repeated to project cords from the rotary casing until the cords wound on the cord spool are exhausted. That is, as the cords wear while the rotary casing rotates, the studs biased by the spring members move automatically from the inner grooves to the outer grooves, respectively, to control the rotating speed of the rotary casing, and the cords are fed out as the torque varies with the variation of the rotating speed, and then the projection of the cords from the rotary casing is stopped automatically for normal mowing operation.

The above and other objects, features and advantages of the present invention will become more apparent from the following description taken in conjunction with the accompanying drawings.

DESCRIPTION OF THE PREFERRED EMBODIMENTS

A cutting head for a cord type mower according to a first embodiment of the present invention will be described hereinafter with reference to FIGS. 1 to 11.

Figure 1:
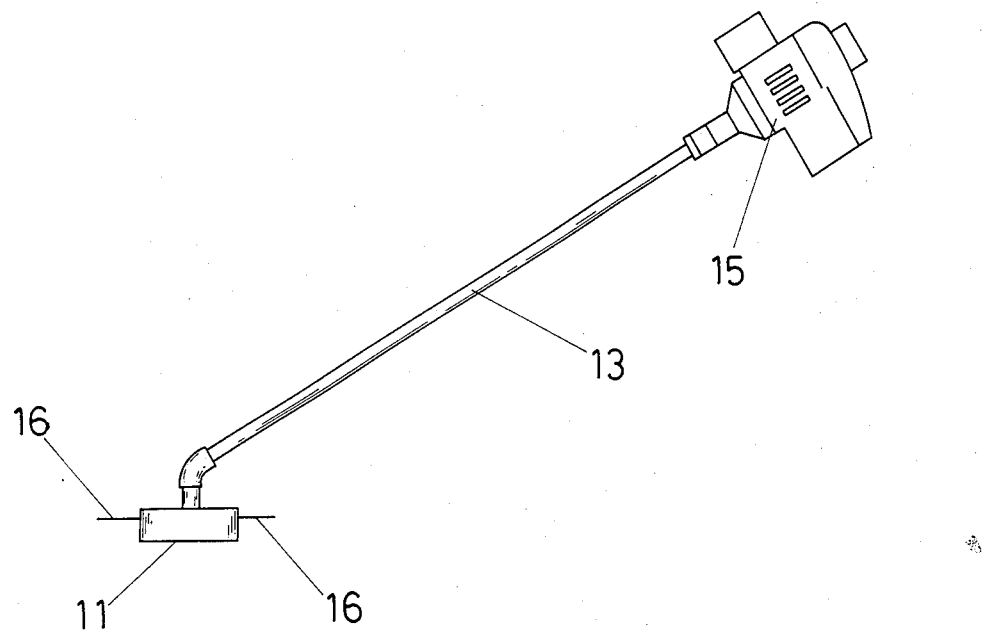
FIG. 1 is a side elevation of a cord type mower.

Referring to FIG. 1 showing the general configuration of a cord type mower, the respective free end portions of a pair of cords 16 are projected diametrically opposite to each other from a cutting head 11. The cutting head 11 is joined to one end of a shaft 13, while an engine 15 serving as a driving source is joined to the other end of the shaft 13. The rotary members of the cutting head 11 are driven for rotation by the engine 15, and thereby the cords 16 are extended radially and are rotated to sever grass and weeds.

Figure 2:
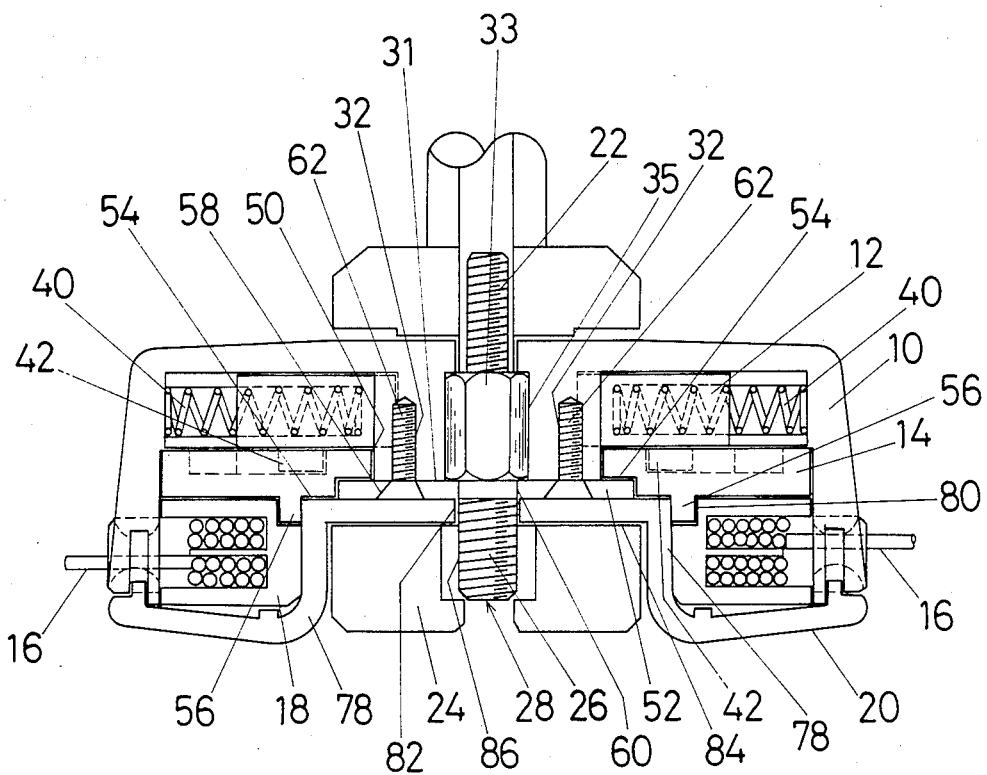
FIG. 2 is a sectional view of a cutting head according to a first embodiment of the present invention.
Figure 3:
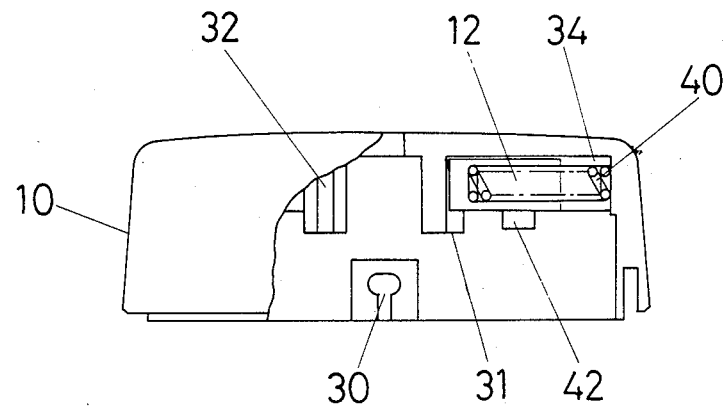
FIG. 3 is a partly cutaway side elevation of a rotary casing employed in the cord type mower of FIG. 2.
Figure 4:
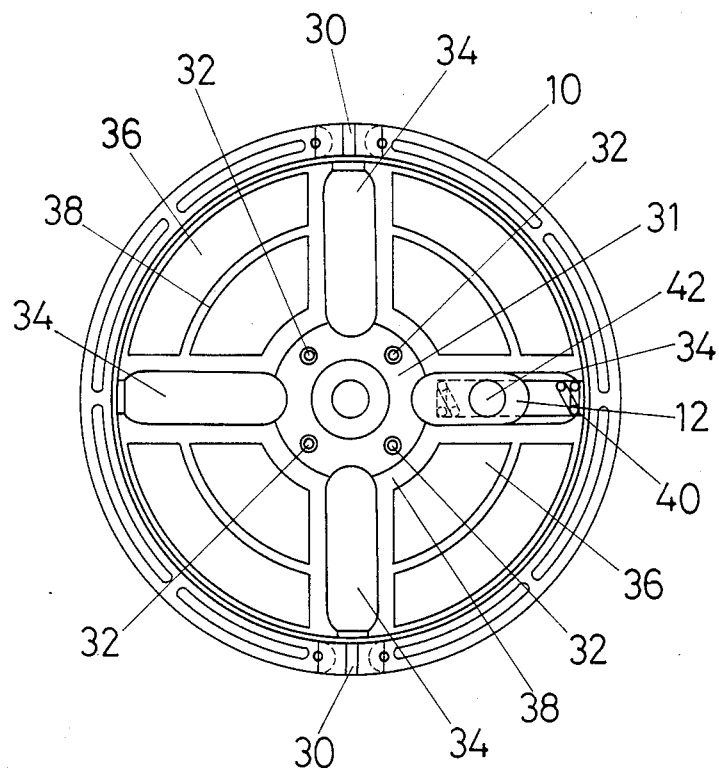
FIG. 4 is a bottom view of the rotary casing of FIG. 3.

Referring to FIG. 2 showing a cutting head according to a first embodiment of the present invention in a longitudinal sectional view, the cutting head basically comprises a bowl-shaped rotary casing 10 having a U-shaped cross section, engaging members 12 normally biased resiliently radially toward the center axis of the rotary casing 10, a speed change control plate 14 provided within the rotary casing 10 and engaging the engaging members 12, a cord spool 18 on which the cords 16 are wound secured to the speed change control plate 14, and a protective cover 20 for protecting the cord spool 18. A threaded rod 28 is fitted axially in the central portion of the rotary casing 10. The rod 28 has an upper threaded portion 22 which engages a driving means, not shown, operatively connected to the engine 15, and a lower threaded portion 26 on which a nut 24 is screwed to fasten the protective cover 20 to the rod 28. The threads formed on the upper threaded portion 22 and the lower threaded portion 26 are either right-hand threads or left-hand threads for self locking depending on the direction of rotation of the rotary casing 10. A pair of cord feeding slots 30 are formed diametrically opposite to each other in the rim of the rotary casing 10 in the open end of same as shown in FIGS. 3 and 4. A cylindrical boss 31 for fixedly holding the speed change control plate 14 and engaging the engaging members 12 projects downward from the upper wall of the rotary casing 10. Four threaded holes 32 are formed symmetrically in the boss 31.

Referring to FIGS. 3 and 4, four radial guide grooves 34 are formed at regular angular intervals in the inner surface of the upper wall of the rotary casing 10. The number of the guide grooves 34 need not necessarily be four, but may be more than four. However, it is preferable to provide an even number of guide grooves in opposite pairs for ensuring stable and balanced high-speed rotation of the rotary casing 10. Circular ribs 38 defining circular hollows 36 are formed on the inner surface of the upper wall of the rotary casing 10 to reinforce and to construct the rotary casing 10 in a lightweight construction, which is an ordinary practice and is not essential to the present invention.

The engaging member 12 is slidably fitted in each guide groove 34 and is biased resiliently toward the center of the rotary casing 10 with a spring 40. Accordingly, the spring 40 is compressed between the inner surface of the rim of the rotary casing 10 and the engaging member 12 so as to urge the engaging member 12 radially toward the center of the rotary casing 10. Although only one of the engaging members 12 are shown in FIG. 4, the rest of the engaging members 12 are provided in the rest of the guide grooves, respectively, in the same condition. A stud 42 is projected downward, in a direction toward the open end of the rotary casing 10, from each engaging member 12

Referring to FIGS. 5 to 8, the generally disk-shaped speed change control plate 14 engages the studs 42 of the engaging members 12. Eight outer groove portions 44 and eight angularly inwardly extending groove portions 46 are formed at regular angular intervals in one side of the speed change control plate 14. Radially extending groove portions 48 are formed so as to interconnect the outer grooves 44 and the inner grooves 46, respectively, so that a zigzag control groove is defined by the outer groove portions 44, the angularly inwardly extending groove portions 46 and the radially extending groove portions 48. The groove portions 44, 46 and 48 have a width and a depth corresponding to the size of the studs 42. The configurations of the outer groove portions 44, the groove portions 46 and the groove portions 48 are designed so that while the studs 42 engage the groove portions 46 during operation, the torque is comparatively small and hence the speed change control plate 14 is rotated at a comparatively low normal rotating speed on the order of 6,000 rpm, and while the studs 42 engage the outer groove portions 44 of the speed change control plate 14, the torque increases and hence the speed change control plate 14 is rotated at a high rotating speed on the order of 10,000 rpm. Each stud 42 is guided from the inner groove 46 to the outer groove portions 44 or in reverse by the groove portions 48.

Figure 5:
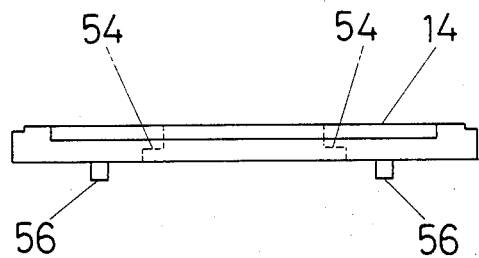
FIG. 5 is an elevation of a speed change control plate employed in the cutting head of FIG. 1.
Figure 7:
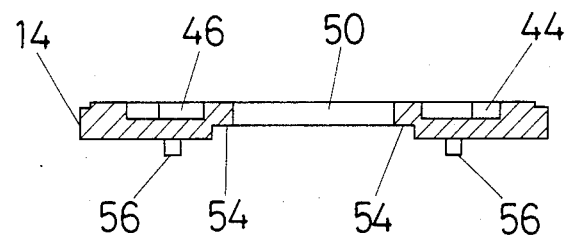
FIG. 7 is a diametrical sectional view of the speed control plate of FIG. 5.
Figure 8:
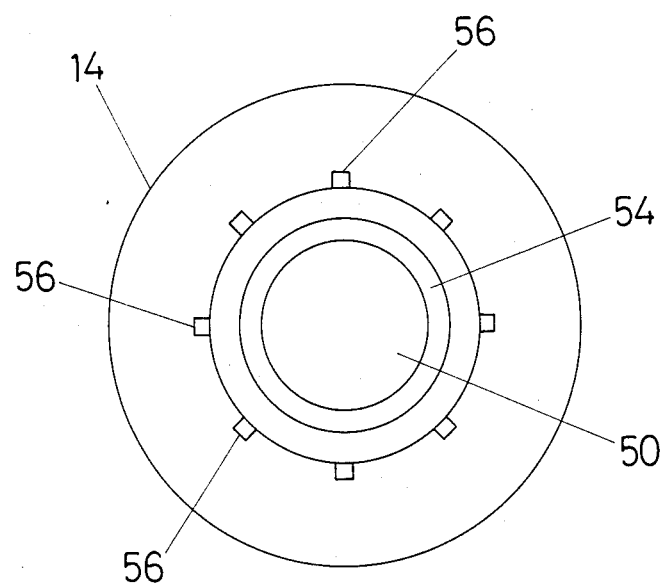
FIG. 8 is a bottom view of the speed change control plate of FIG. 5.

Thus, the speed change mechanism in this embodiment comprises the four radial guide grooves 34 formed at regular angular intervals in the rotary casing 10, the four engaging members 12 slidably fitted in the guide grooves 34 and provided with studs 42, respectively, and the speed change control plate 14 provided with the eight outer groove portions 44, the eight groove portions 46 and the eight groove portions 48 interconnecting the outer groove portions 44 and the groove portions 46. In the normal state, the studs 42 engage the groove portions 46 of the speed change control plate 14, respectively. A circular center hole 50 is formed in the speed change control plate 14 to receive the boss 31 of the rotary casing 10 closely therein so that the studs 42 are able to engage the outer groove portions 44, the groove portions 46 and the groove portions 48. The lower end of the center hole 50 is counterbored to form a seat 54 for receiving an end plate 52, which will be described later. As shown in FIGS. 5, 7 and 8, eight projections 56 for restricting the rotation of the cord spool 18 relative to the speed change plate 14 are arranged at regular angular intervals around the seat 54. The number of the projections 56, like that of the engaging members 12, is not limited to eight, the number of the projections 56 may be more than or less than eight. Naturally, it is preferable to provide an even number of the projections 56 in opposite pairs for the dynamic balance of the speed change plate 14.

The speed change control plate 14 is put in the rotary casing 10 so as to receive the boss 31 of the rotary casing 10 in the center hole thereof and to receive the studs 42 of the engaging members 12 biased toward the center of the rotary casing 10 in the inner grooves 46, then the end plate 52 having a center hole 60 of a diameter slightly greater than that of the rod 28, and four through holes 58 corresponding to the four threaded holes 32 formed in the boss 31 of the rotary casing 10, respectively, is seated on the seat 54, and then screws 62 are screwed through the through holes 58 into the threaded holes 32 to fasten the speed change control plate 14 to the rotary casing 10. A hole 35 for receiving a nut 33 therein is formed in the central portion of the rotary casing 10, and the rod 28 is screwed in the nut 33.

Figure 9:
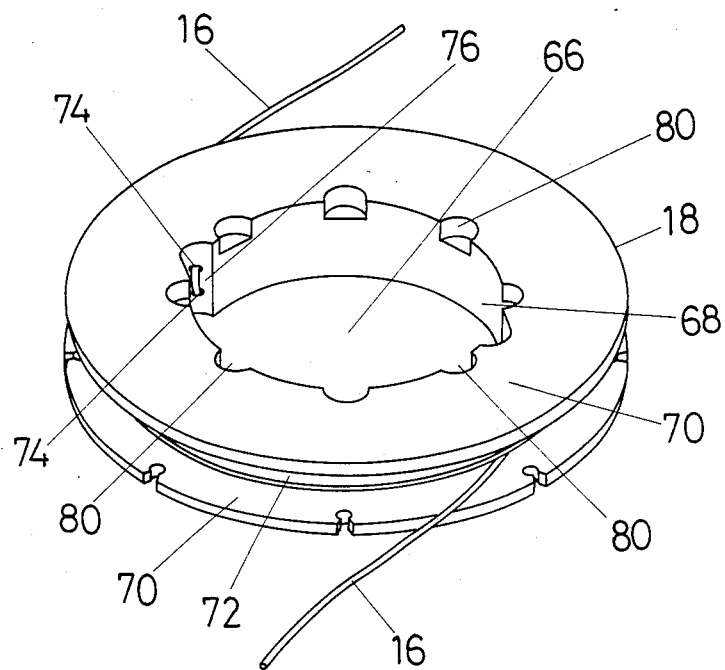
FIG. 9 is a perspective view of a cord spool employed in the cutting head of FIG. 2.
Figure 10:
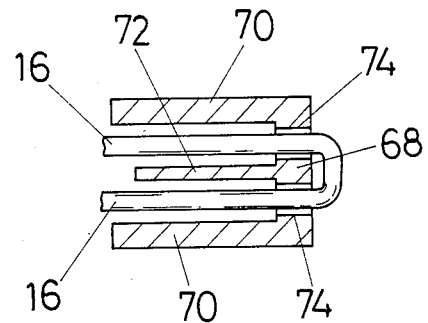
FIG. 10 is a fragmentary sectional view showing the essential portion of the cord spool of FIG. 9.

The cord spool 18 on which the cords 16 are wound will be described hereinafter with reference to FIGS. 9 and 10. Basically, the cord spool 18 has the same construction as the conventional cord spool. A center hole 66 of a comparatively large diameter is formed in the central portion of a short cylindrical body 68. Flanges 70 are formed at the opposite ends of the body 68, respectively. A circular partition plate 72 is formed at the middle position of the body 68 to separate the two cords 16 in separate groups of coils when they are wound on the body 68. This construction of the cord spool 18 is identical with that of the conventional cord spool, except that the cord spool 18 of the present invention is provided with a means for surely and stably fixing the inner ends of the cords 16 to the body 68. That is, a pair of through holes 74 for passing the cord therethrough are formed in part of the body 68 on opposite sides of the partition plate 72. In this embodiment, a 74 from one side to the other side of the partition plate 72, and then one portion of the cord 16 is wound on one section of the body 68 while the other portion of the cord 16 is wound on the other section of the body 68. However, when four cords are to be projected from the rotary casing 10, another pair of through holes like the through holes 74 may be formed in the body 68 at a position diametrically opposite the through holes 74. Part of the inner circumference of the body 68 corresponding to the position where the through holes 74 are formed is cut to form a recess 76 having a depth smaller than the diameter of the center hole 66 and slightly greater than the diameter of the cord 16. The recess 76 is formed so that the cord 16 passed through the through holes 74 will not project from the inner circumference of the body 68 into the center hole 66 and will not interfere with the hub 78 of the cover 20 when the hub 78 of the cover 20 is fitted in the center hole 66. Eight recesses 80 are formed in the circumference of the center hole 66 so as to be engaged by the eight projections 56 of the speed change control plate 18, respectively, to restrict the rotation of the cord spool 16 relative to the speed change control plate 14. Naturally, the number of the recesses is not limited to eight.

Referring to FIG. 2, the cord spool 18 is mounted on the speed change control plate 14 so the projections 56 of the speed change control plate 14 are fitted in the recesses 80, respectively. The cover is formed with a size corresponding to the size of the open end of the rotary casing 10 and is provided with the hub 78 having the shape of a bottom cylinder in the central portion thereof. A through hole 82 for receiving the lower threaded portion 26 of the rod 28 is formed in the central portion of the hub 78. The hub 78 of the cover 20 is fitted in the center hole 66 of the cord spool 18, then the cover 20 is put on the rotary casing 10 so as to receive the lower threaded portion 26 of the rod 28 through the through hole 82, and then a nut 24 is screwed on the lower threaded portion 26 of the rod 28 to fasten the cord spool 18 and the cover 20 to the rotary casing 10. The nut 24 is received in the interior 84 of the hub 78. In this embodiment, the rotary casing 10 is supposed to rotate counterclockwise as viewed from the bottom, and hence the respective threads of the lower threaded portion 26 of the rod 28 and the nut 24 are left-hand threads so that the nut 24 will not unfasten and fall off as the rotary casing 10 rotates.

The operation of the cutting head thus constructed will be described hereinafter with reference to the related drawings, particularly to FIG. 11.

Figure 11:
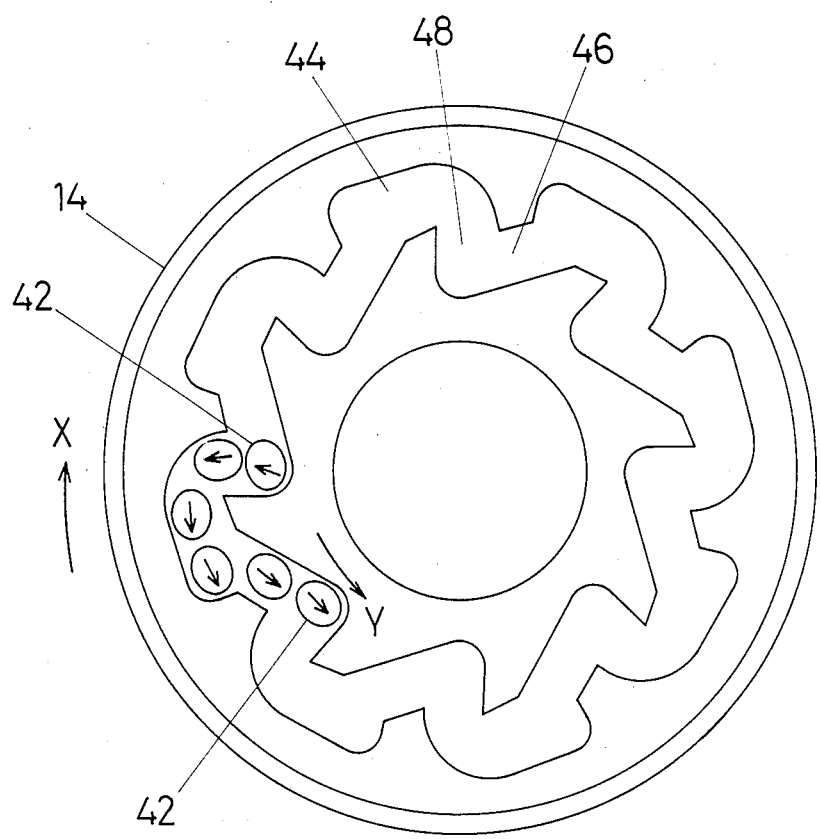
FIG. 11 is an illustration for explaining the functions of studs and the speed change control plate.
Figure 12:
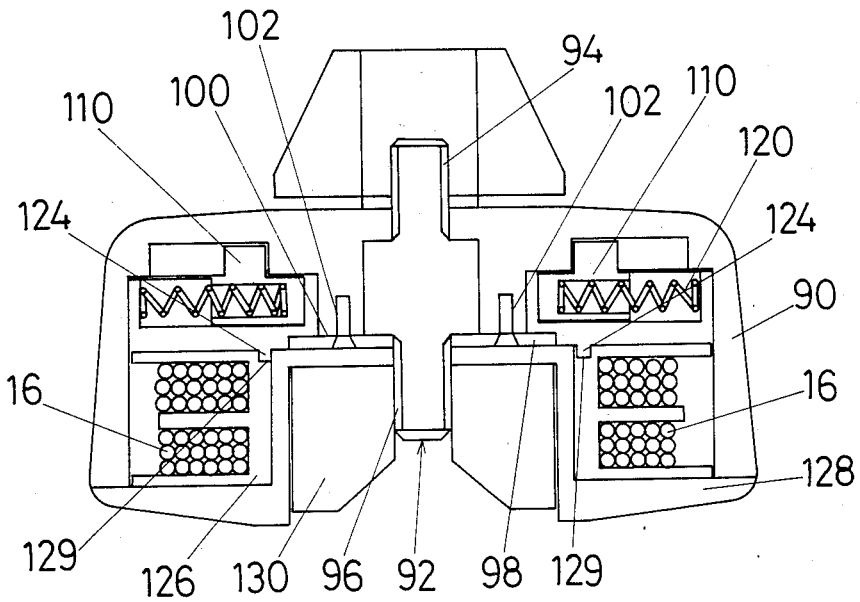
FIG. 12 is a sectional view of a cutting head according to a second embodiment of the present invention.
Figure 13:
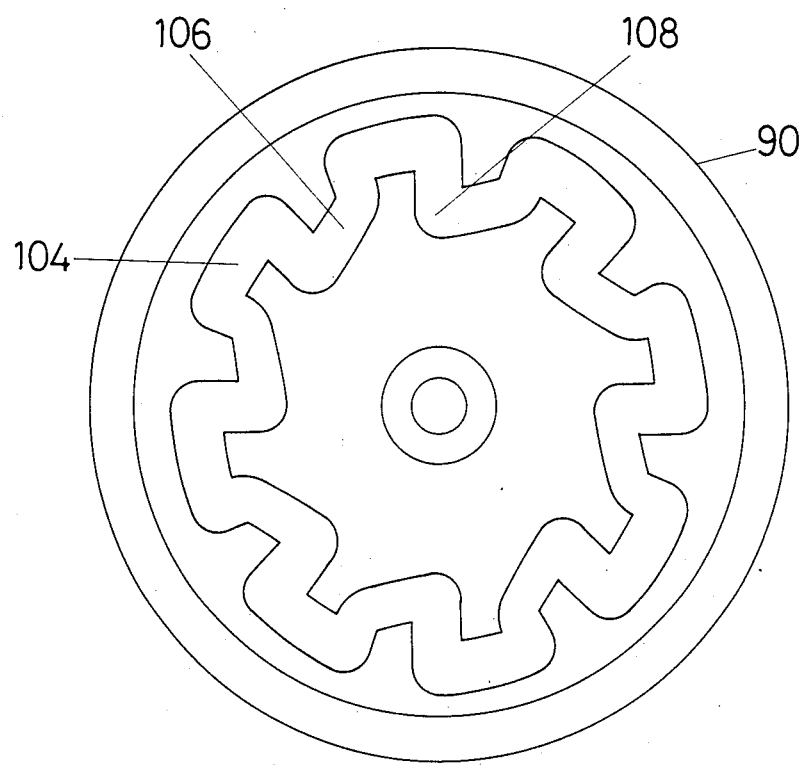
FIG. 13 is a bottom view of a rotary casing employed in the cutting head of FIG. 12.
Figure 14:
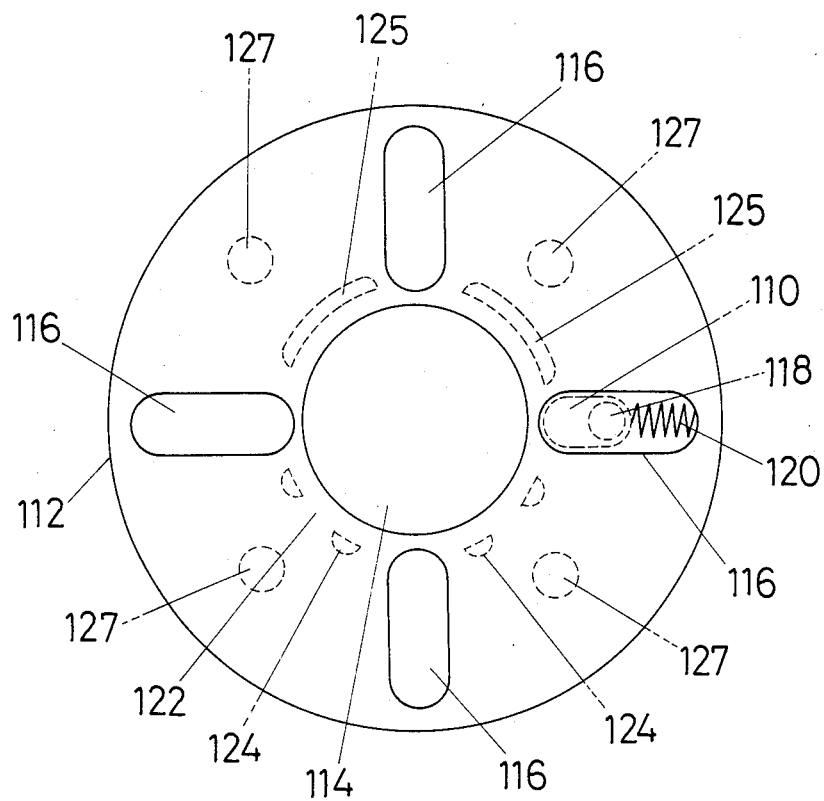
FIG. 14 is a plan view of a speed change control plate employed in the cutting head of FIG. 12.
Figure 15:
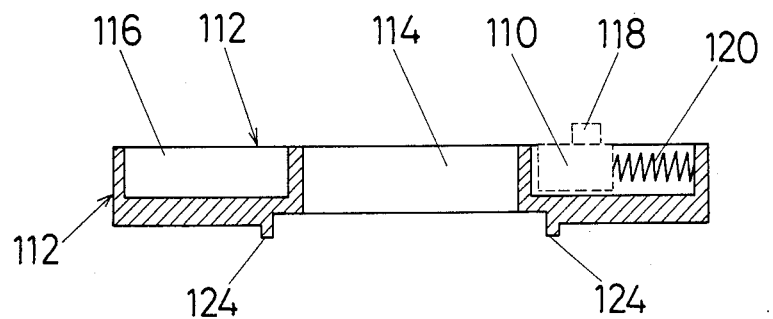
FIG. 15 is a diametrical sectional view of the speed change control plate of FIG. 14.

FIG. 11 is a diagrammatic illustration showing the operative relation between the speed change control plate 14 and the stud 42 of one of the engaging members 12. Actually, the speed change control plate 14 turns relative to the engaging member 12 having the stud 42. However, since it is difficult to illustrate the turning motion of the speed change control plate 14, it is supposed that the stud 42 moves relative to the speed change control plate 14 for convenience's sake.

Referring to FIG. 11, in the normal operating mode, where the cords are projected by an appropriate length from the rotary casing 10 for satisfactory mowing operation, the stud 42 is in engagement with the groove portion 46, so that the cutting head 11 rotates at a rotating speed appropriate for mowing. During the mowing operation, the cords 16 wear and become shorter and thereby the moment of inertia of the cutting head 11 is reduced. Consequently, the rotating speed of the cutting head 11 increases gradually. Then, the stud 42 is moved by a centrifugal force against the resilient force of the spring 40 through the groove portion 48 behind the groove portion 46 with respect to the direction of rotation of the speed change control plate 14 indicated by an arrow X into the outer groove portion 44 as indicated by an arrow Y. As the rotating speed of the cutting head 11 increases, the centrifugal force acting on the cords 16 increases to pull out the cords 16 gradually from the rotary casing 10, while the stud 42 moves further in a direction opposite the direction of rotation of the speed change control plate 14.

As the cords 16 are thus pulled out gradually, the moment of inertia of the cutting head 11 increases, whereby the rotating speed of the cutting head 11 is reduced. Then, the stud 42 is returned by the resilient force of the spring 40 to the normal position, namely, a position where the stud 42 engages the groove portion 46. Thus, the feeding out the cords 16 is completed and the rotating speed of the cutting head 11 is reduced to the rotating speed appropriate for mowing.

A cutting head according to a second embodiment of the present invention will be described hereinafter. Basically, the first and second embodiments are the same in constitution. Accordingly, the second embodiment will be described only in respects differing from the first embodiment and the description of the constitution and functions like those of the first embodiment will be omitted to avoid duplication.

In the second embodiment, a structure corresponding to the speed change control plate 14 of the first embodiment is formed in a rotary casing 90 corresponding to the rotary casing 10 of the first embodiment, while a mechanism corresponding to the speed changing mechanism including the engaging members 12 of the first embodiment is combined with the cord spool 18.

Referring to FIGS. 12 to 15, the bowl-shaped rotating casing 90, similarly to the rotating casing 10 of the first embodiment, has a U-shaped cross section and is provided with slots for feeding out the cords 16 therethrough in the rim thereof at the open end of same. A threaded rod 92 having an upper threaded portion 94 for engagement with driving means and a lower threaded portion 96 for engagement with a nut 130 is inserted in the central portion of the boss of the rotary casing 90. The lower end of the boss 100 is counterbored to form a seat for receiving an end plate 98 thereon. Threaded holes 102 are formed in the boss 100. Eight outer groove portions 104, eight angularly inwardly extending groove portions 106 and eight radial groove portions 108 corresponding to the outer groove portions 44, the groove portions 46 and the groove portions 48, respectively, are formed in the inner surface of the upper wall of the rotary casing 90. The outer groove portions 104 and the groove portions 106 are interconnected by the groove portions 108, respectively having a radially extending portion 113 at the outer end thereof.

A generally bowl-shaped control plate 112 for supporting engaging members 110 has a central hole 114 for receiving the boss of the rotary casing 90. Four radial guide grooves 116 are formed at regular angular intervals in one side of the control plate 112. The engaging members 110 each having a stud 118 are fitted slidably in the guide grooves 116, respectively. Each engaging member 110 is biased resiliently by a spring 120 radially toward the center of the control plate 112. Normally, the stud 118 resides in the inner groove 106 formed in the inner surface of the upper wall of the rotary casing 90. Formed around the central hole 114 on the other side of the control plate 112 is a seat 122 corresponding to the seat 54 of the speed change control plate 14 of the first embodiment, and projections 124 are formed around the seat 122. Furthermore, two projections 125 having a cross section of a circular arc and four comparatively large projections 127 are formed on the other side of the control plate 112. Each projections 127 is formed at the middle of a space between the adjacent guide grooves 116. These projections 124, 125 and 127, similarly to the projections 56 formed on the speed change control plate 14 of the first embodiment, fit recesses 129 formed in the upper surface of a cord spool 126. The respective constructions of the rest of the components including the cord spool 126, the cover 128 and the nut 130 of the second embodiment are substantially identical with those of the first embodiment, and the components of the cutting head of the second embodiment are assembled in the substantially the same manner as those of the cutting head of the first embodiment. Since the functions of the second embodiment are substantially the same as those of the first embodiment, the functions thereof may be understood from the description of those of the first embodiment, and hence the description thereof will be omitted.

A cutting head according to a third embodiment of the present invention will be described hereinafter with reference to FIG. 16.

Essentially, the third embodiment is the same as the first embodiment. Therefore, only the components and constructions of the third embodiment which are different from those of the first embodiment will be described.

Figure 16:
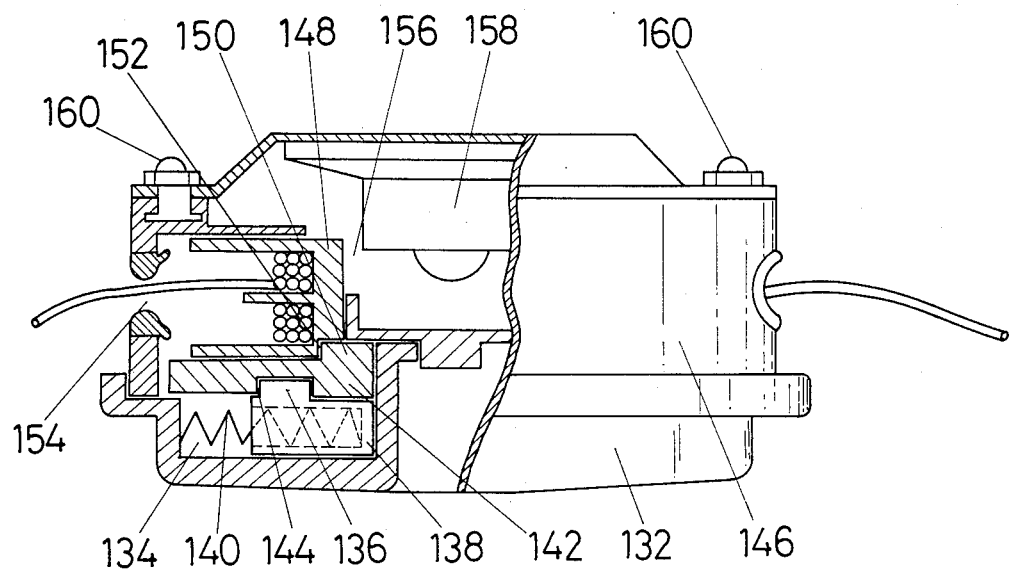
FIGS. 16 and 17 are partial sectional views of cutting heads according to third and fourth embodiments of the present invention.

Referring to FIG. 16, four guide grooves 134 corresponding to the guide grooves 34 of the first embodiment are formed in the inner surface of a cover 132, and engaging members 138 each having a stud 136 are placed slidably in the guide grooves 134 and are biased resiliently by springs 140, respectively, radially toward the center of the cover 132.

A speed change control plate 142 similar in construction to that of the first embodiment and having outer grooves, inner grooves and guide grooves interconnecting the adjacent outer and inner grooves is disposed so that the studs 136 of the engaging members 138 engage the speed change control plate 142. In FIG. 16, the studs 136 of the engaging members 138 are in engagement with the inner grooves 144, respectively. The speed change control plate 142 of the third embodiment is different from the speed change control plate 14 in that the speed change control plate 142 is disposed with one side thereof having the outer grooves, the inner grooves and the guide grooves opposite the cover 132. Projections 150 corresponding to the projections 56 formed in the speed change control plate 14 of the first embodiment are formed in the other side of the speed change control plate 142.

A cord spool 148 is seated on the upper surface, as viewed in FIG. 16, of the speed change control plate 142 facing the upper wall of a rotary casing 146 with recesses 152 formed in the lower surface thereof receiving the projections 150 of the speed change control plate 142, so that the speed change control plate 142 and the cord spool 148 are operatively joined together.

A pair of slots 154 for projecting out the cords therethrough are formed in the rim of the rotary casing 146 at the open end of same. A comparatively large central hole 156 is formed in the upper wall of the rotary casing 146. The central hole 156 and the lower open end of the rotary casing 146 are covered with a mounting cover 158, which is fastened to the lower end of the rotary casing 146 with screws 160. A connecting means such as a fixture for operatively connecting the cutting head to a driving source is provided in the central portion of the mounting case 158.

A cutting head according to a fourth embodiment of the present invention will be described hereinafter with reference to FIG. 17.

The fourth embodiment, similarly to the foregoing embodiments, is provided with a speed change control mechanism.

Figure 6:
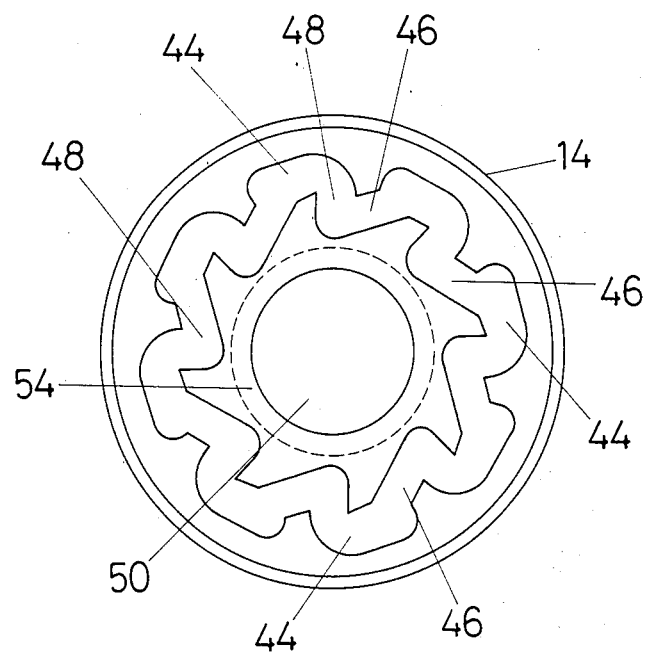
FIG. 6 is a plan view of the speed change control plate of FIG. 5.
Figure 17:
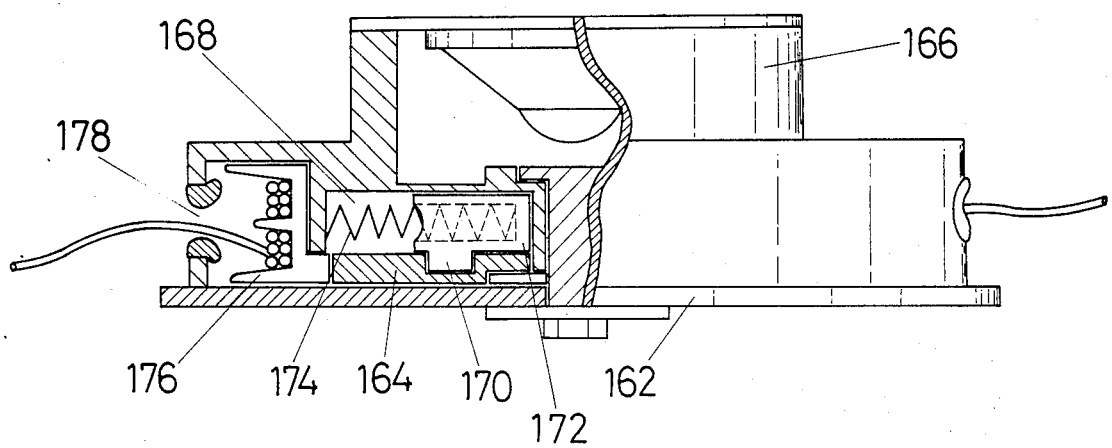

Referring to FIG. 17, a speed change control plate 164 similar in construction to that of the foregoing embodiments is disposed near a cover 162. Although not shown in FIG. 17, the speed change control plate 164 is provided with outer grooves, inner grooves and guide grooves interconnecting the adjacent outer and inner grooves, which are the same in form and function as those of the foregoing embodiments (FIG. 6).

Four radial guide grooves 168 are formed, similarly to those of the first embodiment, in the inner surface of the upper wall of a rotary casing 166 at regular angular intervals (FIG. 4), and engaging members 172 each having a stud 170 are received slidably in the guide grooves 168, respectively. Each engaging member 172 is biased resiliently by a spring 174 radially toward the center of the rotary casing 166.

Whereas the speed change control mechanism and the cord spool are disposed one over the other and are operatively interconnected in the foregoing embodiment, in the fourth embodiment, a cord spool 176 is disposed concentric with the speed change control plate 164 of the speed change control mechanism and receives the speed change control plate 164 in the central hole thereof. Naturally, the speed change control plate 164 and the cord spool 176 are operatively interconnected.

The fourth embodiment is the same in the rest of the construction and functions as the foregoing embodiment, and hence the description thereof will be omitted.

Any suitable cords regardless of the material, such as plastic cords, rubber cords, leather cords, metallic cords or textile cords, are applicable to the cutting head of the present invention.

While preferred embodiments of the present invention have been described using specific terms, such description is for illustrative purposes only, and it is to be understood that many changes and variations may be made without departing from the spirit and scope of the following claims.

As apparent from the foregoing description, the cutting head for a cord type mower according to the present invention has the following advantages:

(1) When the cords wound on the cord spool have been exhausted, the cover is removed from the rotary casing simply by unfastening the nut fastening the cover to the rotary casing, and then the cord spool is removed from the rotary casing for replenishing same with cords through a simple operation without removing any one of the parts of the cutting head contained within the rotary casing. Accordingly, no special tool need be carried along for mowing work and no part of the cutting head will not be lost.

(2) When the cords wear and shorten during the mowing operation, cords are fed out automatically so that the cords of an appropriate length always project from the rotary casing for normal mowing operation.

Thus, according to the present invention, the speed change control mechanism is interlocked with the cord spool and controls the rotating speed of the rotary casing to feed out the cords by the agency of centrifugal force so that the cords are projected by a predetermined appropriate length from the rotary casing and will not be fed out excessively. Accordingly, the cords are always fed out automatically and properly to ensure stable mowing operation.

We claim:

1. A cutting head for a cord type mower in which cords wound on a cord spool project outside the cutting head and are rotated at a high rotating speed by a driving source to sever grass and weeds, said cutting head comprising:
a bowl-shaped rotary casing having slots in the rim thereof through which the cords project, said casing being adapted to be operatively connected to the driving source for being driven in rotation;
a speed change control mechanism in said casing for controlling the speed of rotation of said rotary casing for varying the speed according to the length of the projecting portions of the cords, said speed change control mechanism having a plurality of engaging members, said casing having an upper wall with an inner surface having therein a plurality of radial grooves at regular angular intervals in the circumferential direction of said casing and in which said engaging members are radially slidably received, springs resiliently biasing said engaging members radially toward the center of said rotary casing, a speed change control plate in said casing below said engaging members, said speed change control plate having a control groove therein constituted by a plurality of outer control groove portions therein extending along a circular path at intervals in the circumferential direction of said casing, a plurality of angularly inwardly extending control groove portions extending from the one ends of said outer control groove portions which are downstream in the direction of rotation of said casing and inwardly at an angle to a radius of said casing, and a plurality of radially extending control groove portions extending between the inner ends of said angularly inwardly extending control groove portions and the other ends of said outer control groove portions, a stud on each of said engaging members engaged in said control groove, and said outer control groove portions having an increasing width in the direction from the radially extending control groove portions to said angularly inwardly extending control groove portions;
a cord spool for carrying cords to project through said slots fixedly mounted on the lower side of said speed change control plate; and
a cover member fixed to the lower side of said casing for enclosing said speed change control plate and said cord spool.

2. A cutting head for a cord type mower in which cords wound on a cord spool project outside the cutting head and are rotated at a high rotating speed by a driving source to sever grass and weeds, said cutting head comprising:
a bowl-shaped rotary casing having slots in the rim thereof through which the cords project, said casing being adapted to be operatively connected to the driving source for being driven in rotation;

a speed change control mechanism in said casing for controlling the speed of rotation of said rotary casing for varying the speed according to the length of the projecting portions of the cords, said speed change control mechanism having a control plate having a plurality of radial grooves at regular angular intervals in the circumferential direction of said casing, a plurality of engaging members radially slidably received in said grooves, springs resiliently biasing said engaging members radially toward the center of said rotary casing, said casing having an upper wall with an inner surface having a control groove therein constituted by a plurality of outer control groove portions therein extending along a circular path at intervals in the circumferential direction of said casing, a plurality of angularly inwardly extending control groove portions extending from the one ends of said outer control groove portions which are downstream in the direction of rotation of said casing and inwardly at an angle to a radius of said casing, a plurality of radially extending control groove portions extending between the inner ends of said angularly inwardly extending control groove portions and the other ends of said outer control groove portions, said angularly inwardly extending groove portions each having a short radially extending portion at the point where they join said outer control groove portions, a stud on each of said engaging members engaged in said control groove;

a cord spool for carrying cords to project through said slots fixedly mounted on the lower side of said speed change control plate; and a cover member fixed to the lower side of said casing for enclosing said speed change control plate and said cord spool.

* * * * *